US006790357B2

(12) United States Patent
Norell (10) Patent No.: US 6,790,357 B2
(45) Date of Patent: Sep. 14, 2004

(54) MEDIA BED SUPPORT GRID

(75) Inventor: Robert G. Norell, Ramsey County, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 115 days.

(21) Appl. No.: 10/142,754

(22) Filed: May 9, 2002

(65) Prior Publication Data

US 2002/0185427 A1 Dec. 12, 2002

Related U.S. Application Data

(60) Provisional application No. 60/291,003, filed on May 15, 2001.

(51) Int. Cl.⁷ .............................................. B01D 24/14
(52) U.S. Cl. ..................... 210/345; 210/293; 210/490; 210/497.01; 210/498
(58) Field of Search ................................ 210/162, 291, 210/293, 279, 289, 323.1, 344–347, 456, 486, 488, 489, 498, 499, 490, 497.01; 209/392, 395

(56) References Cited

U.S. PATENT DOCUMENTS 2,643,772 A    6/1953   Martin
3,968,038 A    7/1976   Nilsson
4,065,391 A   12/1977   Farabaugh
4,096,911 A    6/1978   Geske
4,276,265 A    6/1981   Gillespie
4,547,288 A   10/1985   Little ............................ 210/232
5,118,419 A    6/1992   Evans et al.
5,156,738 A   10/1992   Maxson

FOREIGN PATENT DOCUMENTS

DE         42 39 664 A      6/1994
GB            846 457 A      8/1960
WO         WO 99/22064    *  5/1999  ............ D21D/5/16

* cited by examiner

Primary Examiner—Matthew O. Savage
(74) Attorney, Agent, or Firm—Moser, Patterson & Sheridan, L.L.P.

(57) ABSTRACT

A media bed support grid for use with a vessel having an inner surface. The media bed support grid comprises a plurality of filter panels, each filter panel having a plurality of parallel and spaced-apart filter wires, the plurality of filter wires forming a filtering surface. The media bed support grid also comprises a plurality of channels underlying and positioned substantially perpendicular to the filter wires. The media bed support grid further comprises a plurality of manifolds, each manifold being coupled to and in fluid communication with the channels.

23 Claims, 6 Drawing Sheets

MEDIA BED SUPPORT GRID

CROSS REFERENCE TO OTHER APPLICATIONS

This application claims priority under 35 U.S.C. §119 to provisional patent application serial No. 60/291,003, filed on May 15, 2001.

BACKGROUND AND SUMMARY OF THE INVENTION

The present invention relates to a tank or vessel for containing a media bed through which a process flow is directed. More particularly, the present invention relates to a support grid that retains the media bed within the vessel.

Conventional vessels contain a media bed that interacts with a process flow directed through the media bed. Such media beds are used in a variety of processes, including catalytic, molecular sieves, alumina drying, resin ion exchange, carbon filtering, etc. And, various fluids (e.g., oil, gas, water, etc.) may be processed through such a vessel. A typical vessel may be oriented vertically, horizontally, or in other orientations and configurations known to those of ordinary skill in the art. A typical vessel contains a support grid positioned within the vessel to retain the media bed. The support grid includes a filtering surface, which retains the media bed, but allows the process flow there through. In this way, the process flow that exits the vessel has passed through, and, in a typical application, been catalyzed by, the media bed, but the media is retained within the vessel.

Typically, a support grid is located at a tangent line of the vessel, which generally delineates a body of the vessel from a head of the vessel. The support grid retains the media bed in the body of the vessel, leaving the head of the vessel empty below the support grid. The process flow is directed through the media bed and the retaining support grid and into the head of the vessel. From there, the flow is funneled to an outlet that carries the process flow out of the vessel.

Positioning the support grid at the tangent line of a vessel requires a support grid that is adequately reinforced to support the media bed within the body of the vessel. Additionally, with the support grid positioned at the tangent line of the vessel, the volume of the head of the vessel is unusable for containing additional media. A support grid that allows for the use of the volume of the head of the vessel for containing media and withstands a wide range of loads and temperatures without requiring substantial reinforcement at the tangent line would be welcomed by users of such vessels.

According to the present invention, a support grid for use in a vessel containing a media bed includes a filtering surface supporting the media bed and a bottom surface resting on an inner surface of the vessel.

In preferred embodiments, the support grid is comprised of multiple support grid panels coupled together. Each support grid panel is substantially trapezoidal in shape and, when coupled together, the support grid panels form a substantially round support grid. Each panel comprises a plurality of parallel channels running substantially circumferentially around the support grid and supporting a plurality of parallel filter wires running substantially radially. The filter wires are positioned substantially perpendicular to the underlying channels and cooperate to form the filtering surface of the support grid. A plurality of webs of the supporting and underlying channels cooperate to form the bottom surface of the support grid.

In preferred embodiments, the support grid is positioned within the vessel and rests on the inner surface of the head of the vessel. The media bed is supported on top of the support grid. A process flow is directed into the vessel, through the media bed, through the filtering surface of the support grid, and into the channels below. The process flow is then directed circumferentially down the channels and through openings at the ends of the channels. Each opening provides a flow passageway from the channel into a manifold, which is coupled to the filtering surface of the support grid. The manifold then directs the process flow radially to a central collector, which directs the flow out of the vessel.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
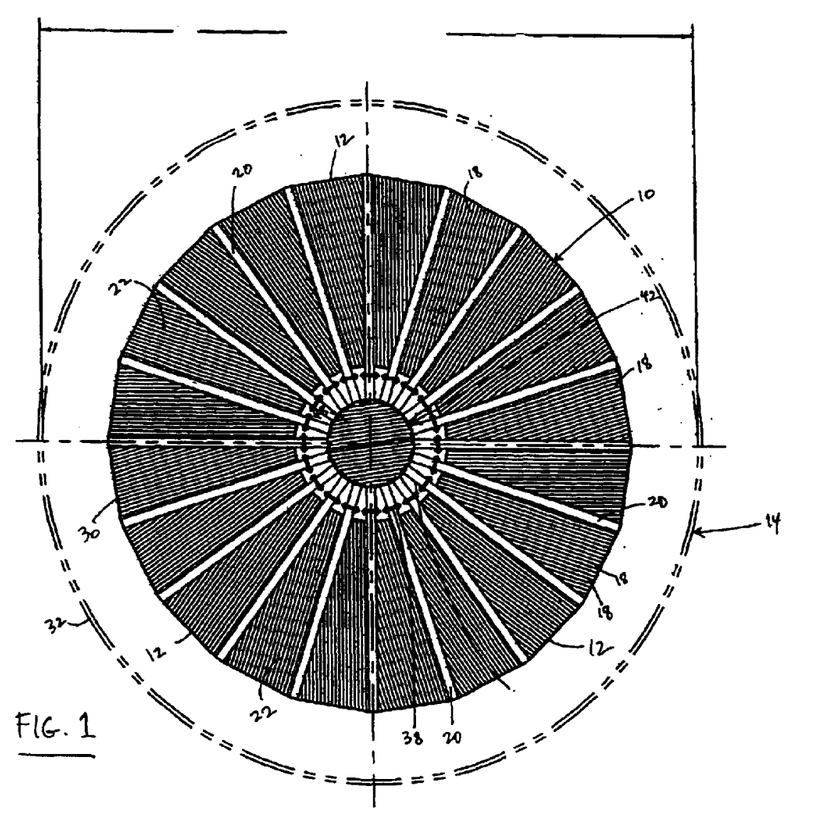
FIG. 1 is a top view of a preferred embodiment of a support grid according to the present invention comprising multiple support grid panels and positioned in a head of a vessel.
Figure 2:
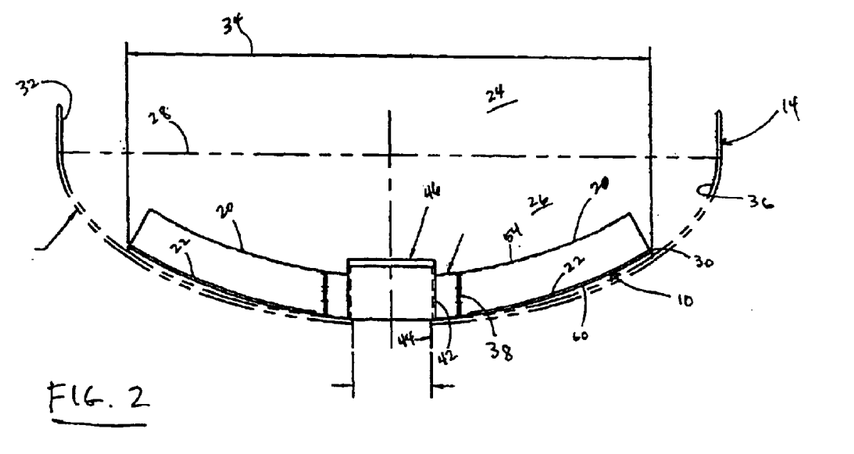
FIG. 2 is a side view of the support grid of FIG. 1 showing the support grid positioned within the head of the vessel.

A preferred embodiment of a media bed support grid 10 according to the present invention is shown in FIGS. 1 through 7. As shown in FIG. 1, the support grid 10 comprises multiple support grid panels 12 and is positioned to lie within a tank or vessel 14. As shown in FIG. 1, the support grid 10 and vessel 14 are generally round and the support grid 10 is positioned substantially concentrically within a perimeter 32 of the vessel 14. However, as one of ordinary skill in the art will readily understand, the support grid 10 and vessel 14 may be configured differently and the support grid 10 may be oriented differently within the vessel 14. For example, as will also be readily understood by one of ordinary skill in the art, the vessel 14, best seen in FIGS. 1 and 2, is a cylindrical, vertical vessel. However, the support grid 10 can be adapted to other types of vessels, such as horizontal vessels, etc.

Referring again to FIG. 1, each support grid panel 12 comprises a plurality of parallel, spaced filter wires 18 and a manifold 20. The filter wires 18 cooperate to form a filtering surface 22 of the support grid 10. A media bed (not shown) is positioned within the vessel 14 and rests on the filtering surface 22 of the support grid 10.

As seen in FIG. 2, the vessel 14 is separated into a body 24 and a head 26, delineated generally by a tangent line 28. The support grid 10 is positioned within the head 26 of the vessel 14 and includes a circumference 30 which is concentrically spaced apart from the perimeter 32 of the vessel 14. In this way, while the head 26 of the vessel 14 is generally elliptical in shape, the portion 34 of an inner surface 36 of the head 26 adjacent to which the support grid 10 is positioned is largely spherical in shape and, therefore, has a generally constant radius. In this way, according to a preferred embodiment of the present invention, the support grid 10 can be manufactured to a substantially spherical specification to rest on the inner wall 36 within the head 26 of the vessel 14.

Moreover, the support grid 10 can be used in conjunction with existing, conventional support grids suspended at the tangent line 28. As will be well known by those of ordinary skill in the art, and as discussed above, such conventional support grids support a media bed above them, but leave empty the space in below them in the head 26 of the vessel 14. The support grid 10 according to the present invention may be assembled in the head 26 of the vessel 14 below an existing, conventional support grid and additional media may be packed between the conventional support grid and the support grid 10 according to the present invention. In this way, vessel 14 may be retrofitted with the support grid 10 to accommodate additional media within existing vessels.

As shown in FIGS. 1 and 2, each manifold 20 includes a bolting flange 38 that provides a connection between the manifold 20 and a central collector 42 of the support grid 10. The central collector 42 engages an outlet nozzle 44 from the vessel 14, which also provides a manway into the vessel 14.

A process flow through the vessel 14 flows through a media bed (not shown) positioned within the body 24 and head 26 of the vessel 14. The media bed rests on the filtering surface 22 of the support grid 10. After flowing through the media bed, the process flow filters between the filter wires 18 of the individual support grid panels 12. As will be more fully discussed below, the filter wires 18 are spaced to allow the passage of the process flow, but retain the media bed. After the process flow has filtered through the filter wires 18, it is directed to the manifolds 20, again as will be more fully discussed below. Each manifold 20 then carries the process flow radially towards the central collector 42, where it is directed out of the vessel 14. The central collector 42 includes a hub cover 46, which also comprises parallel, spaced filter wires 48 to retain the media bed, but allows for the passage of the process flow out the outlet nozzle 44.

Figure 3:
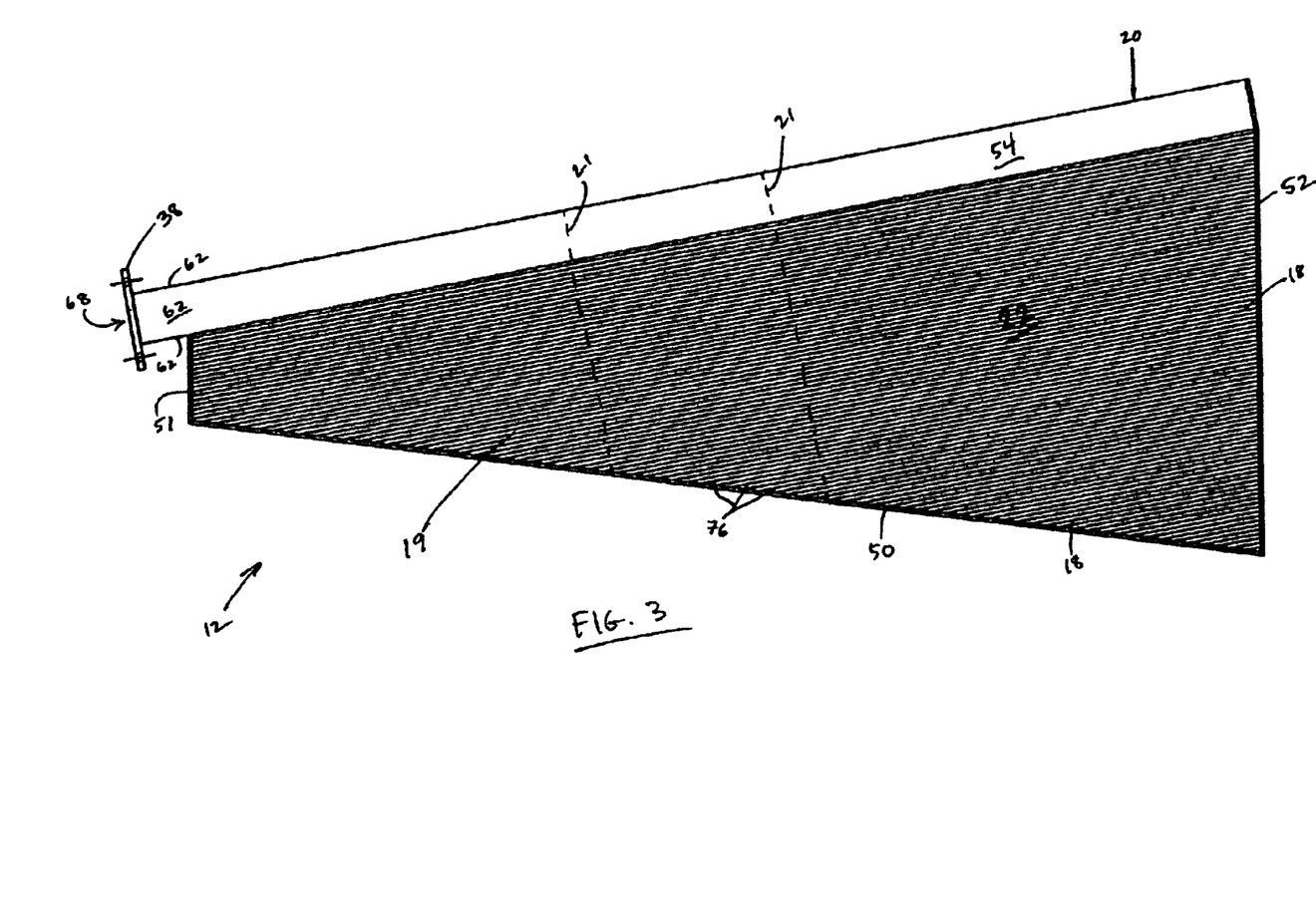
FIG. 3 is a top view of a support grid panel of the support grid of FIG. 1 illustrating parallel, spaced filter wires and a manifold.

The structure of each individual support grid panel 12 can best be seen with reference to FIG. 3. The filter wires 18 are positioned substantially parallel to the manifold 20 and form a generally trapezoidal field 19 of filter wires 18. An outer edge 50, lead edge 51, and back edge 52 of the support grid panel 12 are sealed, as will be more fully discussed below. The end of the manifold 20 opposite the back edge 52 of the support grid panel 12 includes the bolting flange 38, as has previously been discussed. Lastly, as shown in FIG. 2, the manifold portion 20 of the support grid panel 12 stands substantially taller than the rest of the support grid panel 12. That is, as shown in FIG. 2, the filtering surface 22 lies substantially closer to the inner surface 36 of the head 26 than does a top surface 54 of the manifold 20.

Figure 7:
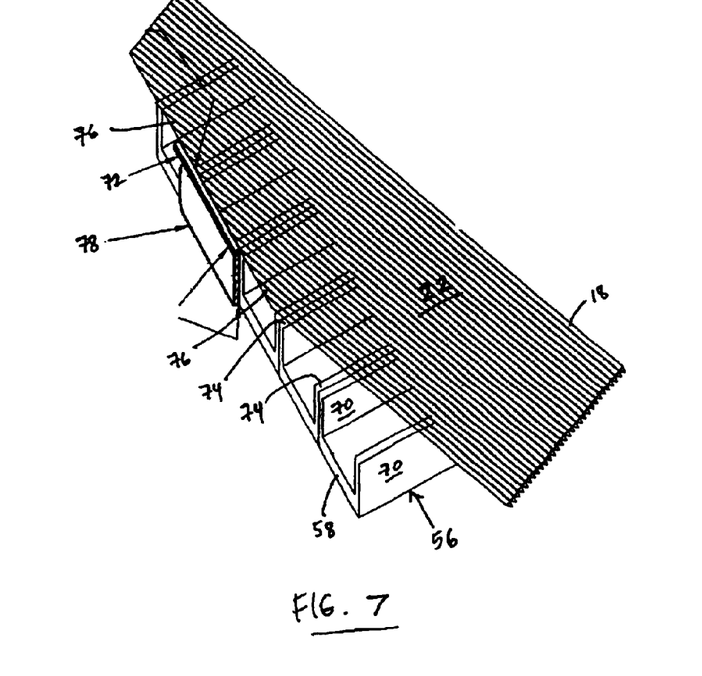
FIG. 7 is a perspective view, with portions cut away, illustrating a sealing assembly on an outer edge of the support grid panel of FIG. 3.

As discussed above, after a process flow (not shown) passes through the filter wires 18, it is directed to the manifold 20. As shown in FIG. 7, a series of channels 56 serve to direct the flow passing through the filter wires 18 to the manifold 20. The filter wires 18 are supported by and positioned generally perpendicular to the underlying channels 56.

The filter wires 18 are welded to the channels 56 and are spaced apart sufficiently to retain the media bed, but allow the process flow into the channels. As will be more fully discussed below, the channels 56 are otherwise sealed. Additionally, each panel 12 is sealingly bolted to the central collector 42 at the bolting flanges 38. In this way, any flow entering the channels 56, and ultimately exiting the vessel 14, must filter through the filter wires 18 that comprise the filtering surface 22 of the support grid 10.

Figure 4:
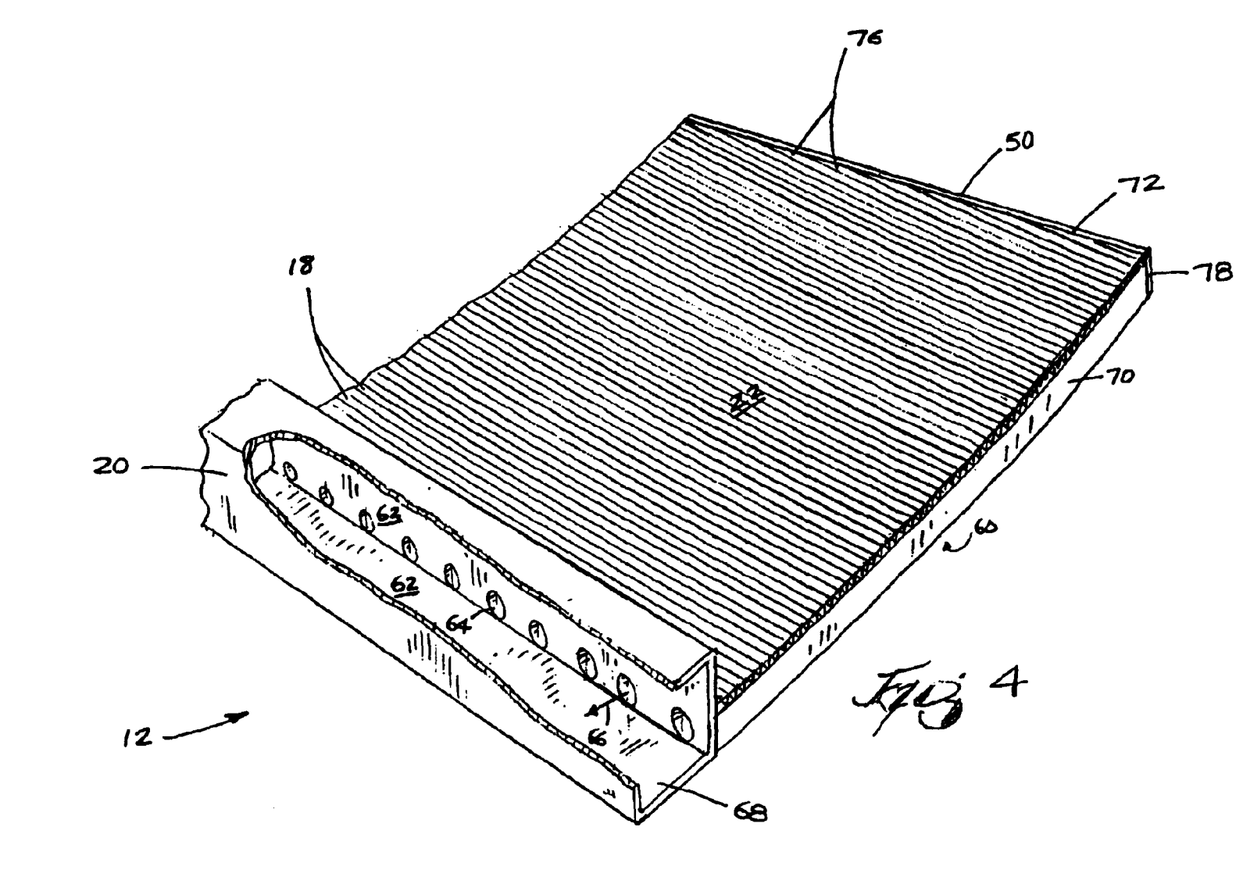
FIG. 4 is a perspective view, with portions cut away, of a support grid panel illustrating a series of openings providing passageways between an interior of the manifold and a plurality of channels underlying and supporting the filter wires.
Figure 5:
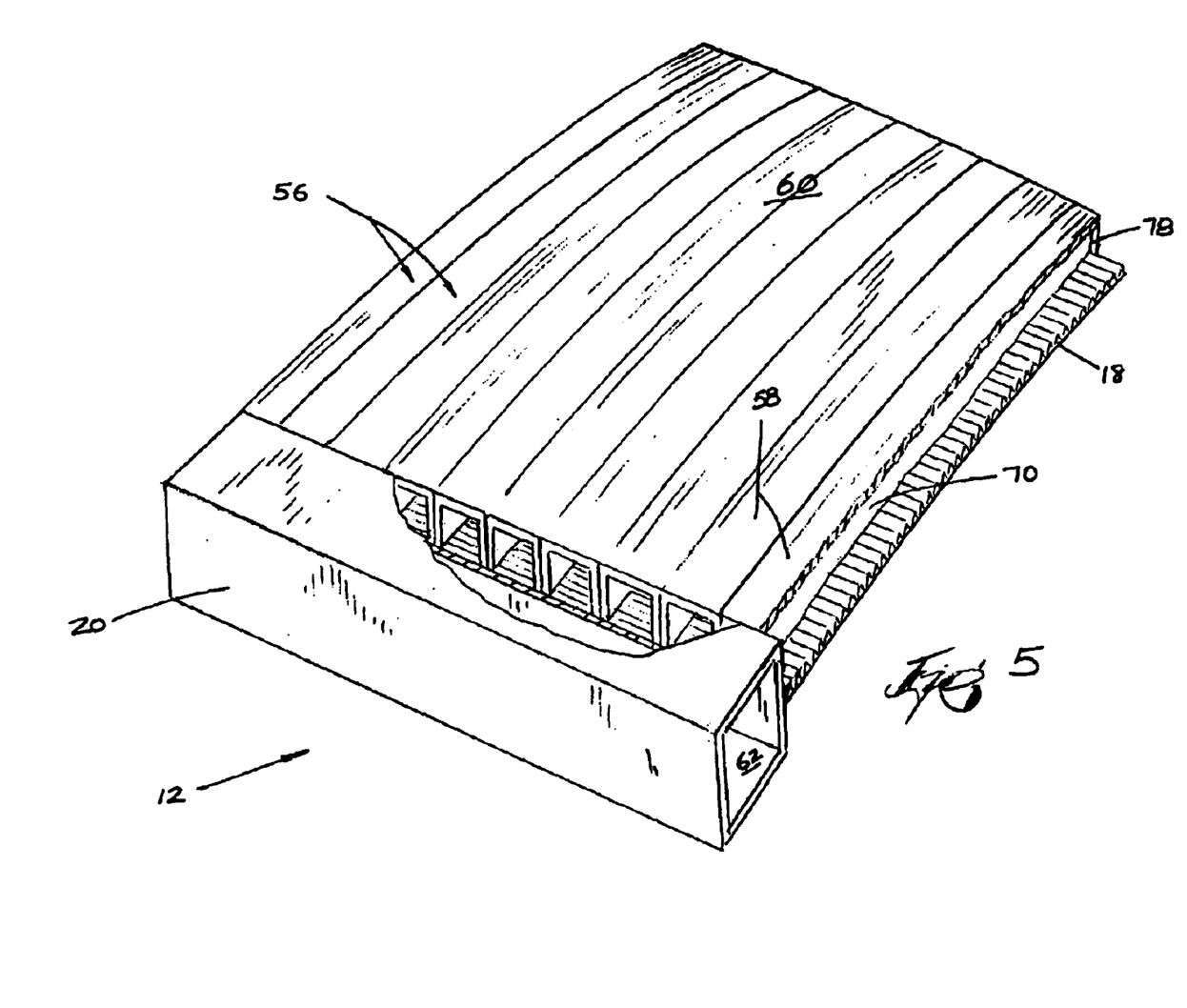
FIG. 5 is a bottom view, with portions cut away, of the support grid panel of FIG. 4 showing a plurality of web portions of the channels of the support grid panel, which cooperate to form a bottom surface of the support grid.

Referring to FIGS. 4 and 5, a section of the support grid panel 12 is shown. The section is representative of a section of the support grid panel 12 taken, for example, between dotted lines 21 of FIG. 3. As can be seen with reference to FIGS. 3 and 4, the manifold 20 in FIG. 4 is coupled to the opposite edge of the filtering surface 22 than is the manifold 20 in FIG. 3. Other than this difference, the two panels shown in FIGS. 3 and 4 are structurally similar. Therefore, the same reference numerals used to refer to elements of the support grid panel 12 of FIG. 3 will be used when referring to elements of the support grid panel 12 of FIG. 4.

Referring to FIG. 4, the filtering surface 22 of the support grid panel 12 is comprised of multiple, parallel filter wires 18. The filter wires 18 are welded to and supported by a series of underlying channels 56, best seen in FIG. 5. As one of ordinary skill in the art will readily recognize, the channels 56 are oriented substantially perpendicular to the filter wires 18. Each channel 56 includes a web portion 58. When positioned side by side, as shown in FIG. 5, the web portions 58 cooperate to form a bottom surface 60 of the support grid panel 12. Therefore, as one of ordinary skill in the art will readily recognize, FIG. 4 illustrates the filtering surface 22 of the support grid panel 12 with the filter wires 18 running parallel to the manifold 20. And, FIG. 5 shows the support grid panel 12 flipped over and illustrate the bottom surface 60 of the support grid panel 12 with the channels 56 running substantially perpendicular to the manifold 20.

In FIGS. 4 and 5, only a portion of the manifold 20 is shown. As best seen with respect to FIGS. 1, 2, 3, and 6, the complete manifold 20 extends well above the filtering surface 22 and includes four manifold walls 62 that form a rectangular tube that carries the process flow to the central collector. FIGS. 4 and 5 include only portions of two of the manifold walls 62. In this way, a series of openings 64, which define flow passageways 66 connecting each channel 56 to an interior 68 of the manifold 20 can best be seen. Referring to FIGS. 4, and 5, each opening 64 is associated with a channel 56 running substantially perpendicularly to the manifold 20. As mentioned above, the process flow is filtered through the filtering surface 22 after it passes through the media bed. From there, the process flow enters the channels 56 and is carried circumferentially through the openings 64 to the interior 68 of the manifold 20. The process flow is then carried radially by the individual manifolds 20 to the central collector 42 where it exits the vessel through the outlet nozzle 44.

Referring to FIG. 5, the channels 56 have unperforated sidewalls 70 and web portions 58. Therefore, the process flow can only enter the channels 56 after having been first filtered through the filtering surface 22, which overlays the channels 56. This insures that only process flow that has interacted with the media by flowing through the media bed enters the channels 56 and flows out of the vessel 14.

The filter wires 18 are spaced to prevent the media from passing between them and, therefore, the media is prevented from exiting the vessel 14. To insure that only the process flow exits the vessel 14, each support grid panel 12 is sealed along its edges. An outer edge 50, best seen in FIGS. 3, 4 and 7 includes a closure bar 72 (FIG. 7) welded to the tips 74 of the channels 56 opposite the web portions 58. The closure bar 72 seals the loose ends 76 (FIGS. 3 and 4) of the filter wires 18, which are created when the support grid panel 12 is cut to its trapezoidal shape. After the closure bar 72 is welded to the channels 56, a sealing bar 78 is welded to the closure bar 72 and to the web portions 58 of the channels 56. In this way, the outer edge 50 of the panel 12 is sealed to prevent media from entering the channels 56.

Figure 6:
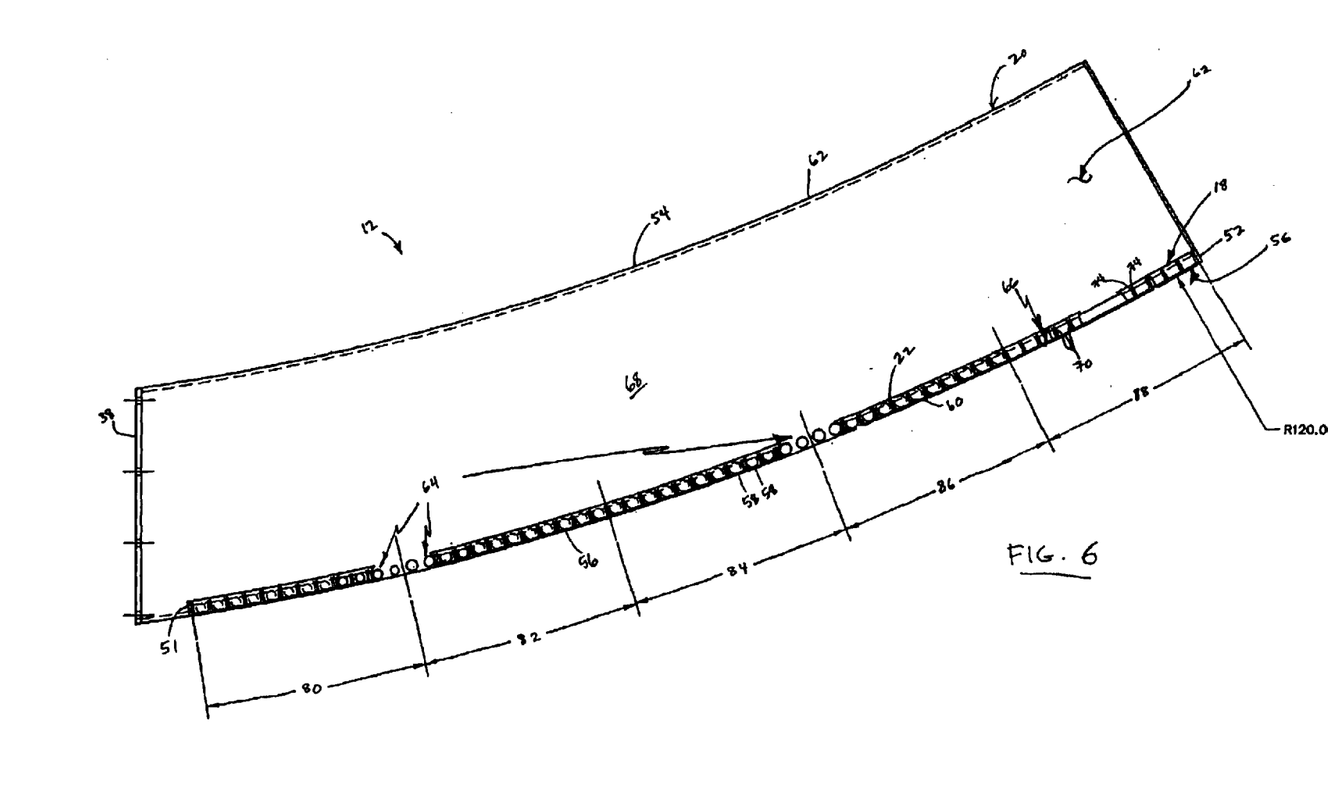
FIG. 6 is a side view, with portions cut away, showing a series of openings along an entire length of the support grid panel of FIG. 3 opening into the manifold.

As discussed with respect to FIG. 3, the filtering surface 22 of each individual support grid panel 12 is generally trapezoidal in shape. Because of this, there is greater filtering area on the filtering surface 22 towards the back edge 52 of the panel 12 than there is towards the lead edge 51. As one of ordinary skill in the art will readily understand referring to FIG. 1, there is also a greater volume of media sitting on top of the support grid panels 12 towards the circumference 30 of the support grid 10 than there is towards the central collector 42. Therefore, to keep the process flow consistent through the entire media bed, those channels 56 towards the back edge 52 of each individual panel 12 must handle greater flow than those channels 56 positioned towards the lead edge 51. To accommodate these varying flows, the openings 64 connecting the channels 56 to the manifold 20 are varied along the length of the manifold 20. As shown in FIGS. 4 and 6, the openings 64 positioned towards the bolting flange 38 are smaller than the openings 64 positioned away from the bolting flange 38. The openings 64 are generally divided by size into five zones. A first zone 80 includes openings 64 that, according to a preferred embodiment, are approximately ⅜ of an inch in diameter. The openings 64 in a second flow zone 82 are slightly larger and, according to a preferred embodiment, are 7/16 of an inch in diameter. A third and fourth flow zone, 84 and 86 respectively, include openings 64 that are 15/32 of an inch in diameter and ½ of an inch in diameter, respectively. Finally, a fifth flow zone 88 is constructed to allow complete flow between the channels 56 and the manifold 20. In other words, the wall 62 of the manifold 20 is completely cut away from the end of the channel 56 so that the flow between the channel 56 and the manifold 20 is unrestricted. As one of ordinary skill in the art will readily understand, the size of the openings 64 can be varied according to the particular flow to be processed, the particular configuration of the vessel 14 being used, and other considerations as will be apparent to those of ordinary skill in the art. Additionally, it will be understood by one of ordinary skill in the art that the size of the openings 64 along the length of the manifold 20 may be varied constantly over the length of the manifold 20 and do not necessarily need to be varied in zones as shown in FIG. 6.

As discussed above, support grid 10 filters the process flow so that only the product being processed exits the vessel 14 through the outlet nozzle 44. The media bed within the vessel is prevented from entering the channels 56 and exiting the vessel 14 with the process flow. However, referring to FIG. 2, the support grid 10 does not need to be sealed to the inner wall 36 of the vessel 14. If media gets between the bottom surface 60 of the support grid 10 and the inner surface 36 of the head 26 it still cannot exit the vessel 14 because the only way into the channels 56, and ultimately into the manifold 20, through the central collector 42, and out the outlet nozzle 44, is through the filtering surface 22.

As shown in FIG. 7, according to a preferred embodiment of the present invention, the filter wires 18 are substantially triangular in cross-section and are welded on end to the channels 56 to form the filtering surface 22. Screen material comprising triangular-shaped profile wire welded to channel rod as shown in FIG. 7 will be readily recognized by those of ordinary skill in the art. Additionally, the method of manufacturing such screen material will be known to those of ordinary skill in the art. However, according to other embodiments of the present invention, other screen material may be used. For example, in another embodiment of the present invention, a screen material comprising round filter wires welded to perpendicularly running round support rods may be used instead of the filter wires 18 mounted to the channels 56. If a screen material comprising round filter wires mounted to underlying round support rods is utilized instead of the filter wires 18 and channels 56 shown in FIGS. 1 through 7, the screen material must be placed over a tray or other such structure that functions like the channels 56 to collect the process flow filtered through the screen material and direct it to the manifold. Again, the screen material and tray are sealed so that only the product being processed enters the tray and flows into the manifold. The screen material is sealed to the tray so that media does not enter the tray and exit the vessel.

Moreover, it will be readily understood by one of ordinary skill in the art that other profiles of filter wire may be mounted to the channels 56 in accordance with the present invention. Additionally, the profile of the filter wires and supporting rods in a screen material sealingly coupled to a tray, as described above, may be varied in accordance with the present invention. In all cases, a support grid according to the present invention is itself sealed and is sealed to an outlet exiting the vessel. The support grid rests on the inner surface of the vessel and does not need to be reinforced and sealed at some point within the vessel. In this way, according to a preferred embodiment of the present invention as shown in FIGS. 1 and 2, the weight of the media bed is distributed across the support grid 10 and the portion 34 of the inner surface 36 of the vessel 14 against which it rests. It will be readily apparent to those of ordinary skill in the art that the portion of the inner surface 36 against which the support grid rests may be located in portions of the vessel 14 other than the head 26. For example, in a horizontal vessel, the support grid may be oriented and configured to rest against a sidewall of the vessel 14.

Figure 8:
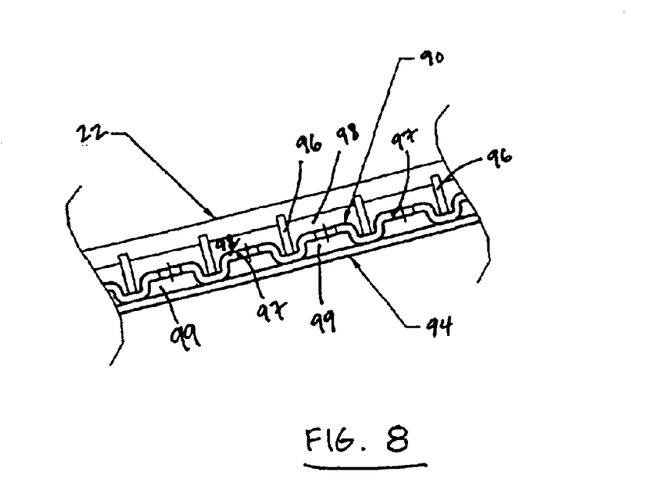
FIG. 8 is cross-section of a second embodiment of a support grid according to the present invention illustrating a flow distribution surface positioned within a series of channels of a support grid panel.

In addition to filtering a process flow, the support grid 10 may be utilized in a back flow process wherein the direction of flow is reversed. In the back flow process, the flow flows radially outward from the central collector 42, through the manifolds 20, the channels 56, the filtering surface 22, and up through the media bed. As shown in FIG. 8, in yet another embodiment of a support grid in accordance with the present invention, a flow distribution surface 90 may be placed between the filtering surface 22 and a closure wall 94. A series of vertical walls 96 create passageways 98 similar to those created by the channels 56 of FIG. 7. Additionally, a series of chambers 99 are created between the flow distribution surface 90 and the closure wall 94. Therefore, with reference to FIG. 8, a collection flow flows through the filtering surface 22, through a series of orifices 97 in the flow distribution surface 90, and down the chambers 99. From the chambers 99, the flow passes through the openings 64 and into the manifold 20 in a way similar to that described with respect to the embodiment shown in FIGS. 1 through 7. However, in a back flow process, flow is directed radially outward down the manifolds 20 and into the chambers 99 below the flow distribution surface 90. Then, controlled by the orifices 97 in the flow distribution surface 90, the flow is distributed through the flow distribution surface 90, through the filtering surface 22, and through the media bed.

Although the invention has been described in detail with reference to certain preferred embodiments, variations and modifications exist within the scope and spirit of the invention as described and defined in the following claims.

What is claimed is:

1. A media bed support grid for use with a vessel, the vessel having an inner surface, the media bed support grid comprising a plurality of filter panels, each filter panel comprising:

a plurality of parallel and spaced-apart filter wires forming a filtering surface for filtering a process flow;

a plurality of channels underlying and having longitudinal major axes positioned substantially perpendicular to the filter wires, each channel having a bottom wall adapted to be positioned adjacent to the inner surface of the vessel, opposing and substantially parallel side walls for supporting the filter wires and defining upwardly facing openings for receiving a process flow, and an open end facing in a direction parallel to the longitudinal major axes of said channels for delivering the process flow; and a tubular manifold having a wall intersecting the longitudinal major axes of said channels and covering the open ends of said channels, an interior of the manifold being coupled to and in fluid communication with the respective open ends of the plurality of channels via openings extending through said wall.

2. The media bed support grid of claim 1, wherein the bottom wall of the channels form a bottom surface of the support grid opposite and substantially parallel to the filtering surface, and the bottom surface lies adjacent to the inner surface of the vessel.

3. The media bed support grid of claim 1, wherein the openings are of various sizes.

4. The media bed support grid of claim 3, wherein each filter panel has a leading edge and a back edge that each extends across a major longitudinal axis of the filter wires, and wherein at least one of said openings positioned towards the leading edge is smaller than at least one of said openings positioned towards the back edge.

5. The media bed support grid of claim 1, further comprising a central collector sealingly coupled to the manifolds of the panels.

6. The media bed support grid of claim 5, wherein the central collector has a cover, the cover comprising a second plurality of parallel and spaced-apart filter wires.

7. The media bed support grid of claim 1, wherein at least one of said channels includes a flow distribution surface that divides the channel into first and second chambers, and wherein the flow distribution surface includes a plurality of orifices defining flow paths between the first and second chambers.

8. The media bed support grid of claim 1, wherein the filter panel has an outer edge, and wherein the manifold is positioned parallel to the filter wires and sealed to an edge of the filter panel that is opposite the outer edge, and further comprising a bar sealingly welded to the outer edge, thereby sealing the filter panel at the outer edge.

9. The media bed support grid of claim 8, wherein the bar is sealingly welded to a second bar, the second bar being welded to the filter wires.

10. The media bed support grid of claim 1, wherein the plurality of filter panels together form a concave media bed support grid.

11. The media bed support grid of claim 10, wherein major axes of said filter wires of the concave media media bed support grid are oriented transversely to a longitudinal axis of the body of the vessel when said grid is mounted in said vessel.

12. The media bed support grid of claim 11, wherein the concave media bed support grid rests on the inner surface of a head of the vessel when said grid is mounted in said vessel.

13. The media bed support grid of claim 12, wherein the concave media bed support grid further comprises:

a perimeter that generally conforms to a profile of the inner surface of the vessel body.

14. The media bed support grid of claim 13, wherein the concave media bed support grid further comprises:

a manifold.

15. A media bed support grid for use with a vessel, the vessel having an inner surface, the media bed support grid comprising a filter panel, the filter panel comprising:

a plurality of parallel and spaced-apart filter wires forming a filtering surface for filtering a process flow;

a plurality of channels underlying and having longitudinal major axes positioned substantially perpendicular to the filter wires, each channel having a bottom wall adapted to be positioned adjacent to the inner surface of the vessel, opposing and substantially parallel side walls for supporting the filter wires and defining upwardly facing openings for receiving a process flow, and an open end facing in a direction parallel to the longitudinal major axes of said channels for delivering the process flows; and a tubular manifold having a wall intersecting the longitudinal major axes of said channels and covering the open ends of said channels, an interior of the manifold being coupled to and in fluid communication with the respective open ends of the plurality of channels via openings extending through said wall.

16. The media bed support of claim 15, wherein a major axis of the manifold is substantially parallel to a major axis of the filter wires.

17. The media bed support grid of claim 16, wherein the openings are of various sizes.

18. The media bed support grid of claim 16, wherein each filter panel has a leading edge and an opposite back edge that extends across the major longitudinal axis of the filter wires, and wherein at least one of said openings positioned proximate the leading edge is smaller than at least one of said openings positioned proximate the back edge.

19. The media bed support grid of claim 15, further comprising a central collector sealingly coupled to the manifolds of the panels.

20. The media bed support grid of claim 19, wherein the central collector has a cover, the cover comprising a second plurality of parallel and spaced-apart filter wires.

21. The media bed support grid of claim 15, wherein at least one channel includes a flow distribution surface that divides the channel into first and second chambers, and wherein the flow distribution surface includes a plurality of orifices defining flow paths between the first and second chambers.

22. The media bed support grid of claim 15, wherein the filter panel has an outer edge, and wherein the manifold is positioned parallel to the filter wires and sealed to an edge of the filter panel that is opposite the outer edge, and further comprising a bar sealingly welded to the outer edge, thereby sealing the filter panel at the outer edge.

23. The media bed support grid of claim 22, wherein the bar is a first bar, the first bar sealingly, welded to a second bar, the second bar also welded to the filter wires.

* * * * *